R. & P. J. BROWNSON.
STUFFING MACHINE.
APPLICATION FILED MAY 14, 1906.
976,982.
Patented Nov. 29, 1910.
3 SHEETS—SHEET 1.
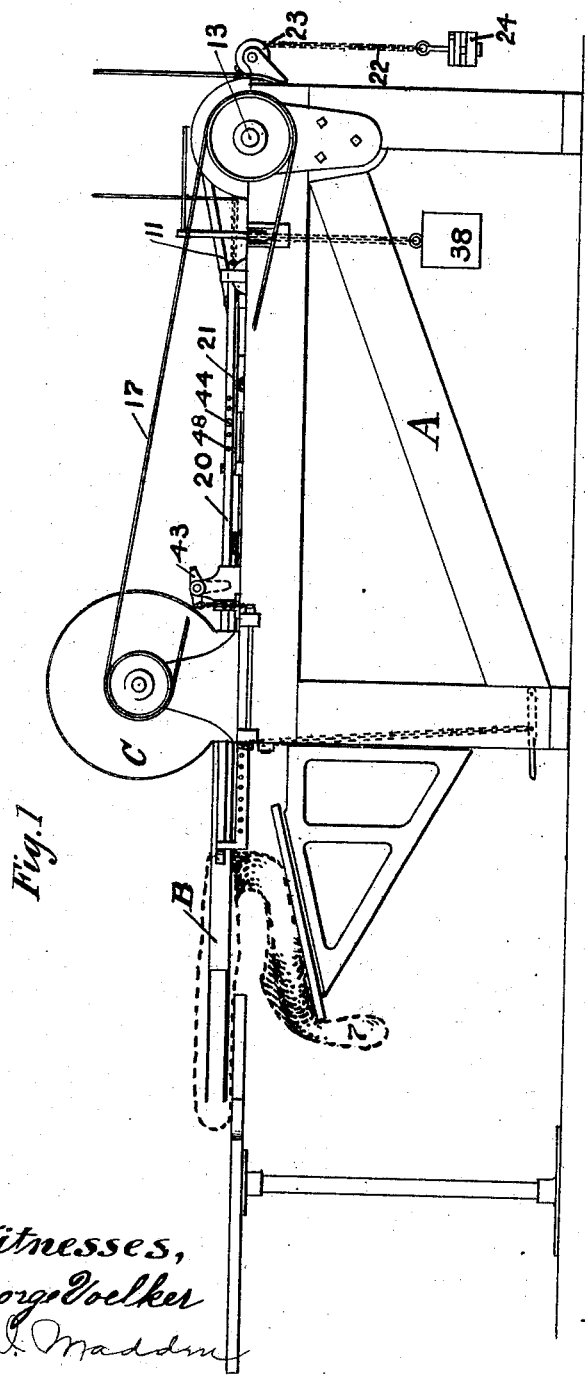
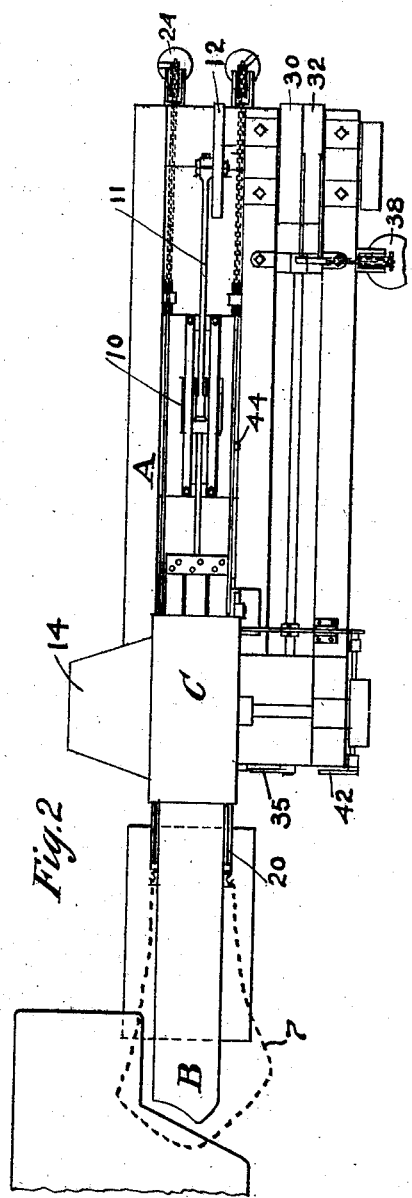
Witnesses,
George Voelker
Inventors,
Percy J. Brownson
Ralph Brownson
by Lothrop & Johnson
their Attorneys.

R. & P. J. BROWNSON.
STUFFING MACHINE.
APPLICATION FILED MAY 14, 1906.

976,982.

Patented Nov. 29, 1910.
3 SHEETS—SHEET 2.

Witnesses,
George Voelker

Inventors,
Percy J. Brownson
Ralph Brownson
by Lothrop & Johnson
their Attorneys.

R. & P. J. BROWNSON.
STUFFING MACHINE.
APPLICATION FILED MAY 14, 1906.
976,982.
Patented Nov. 29, 1910.
3 SHEETS—SHEET 3.
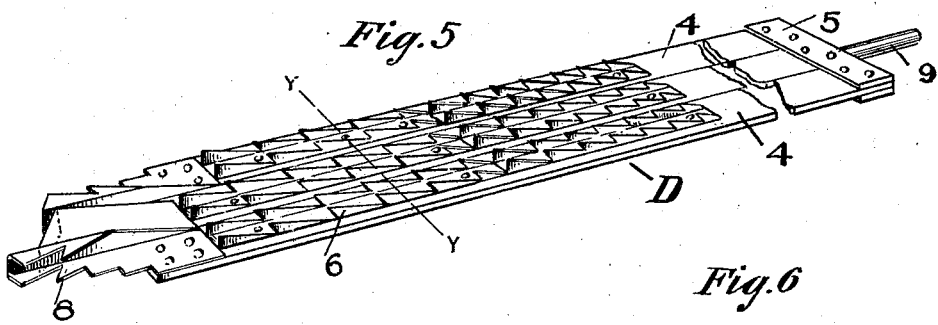
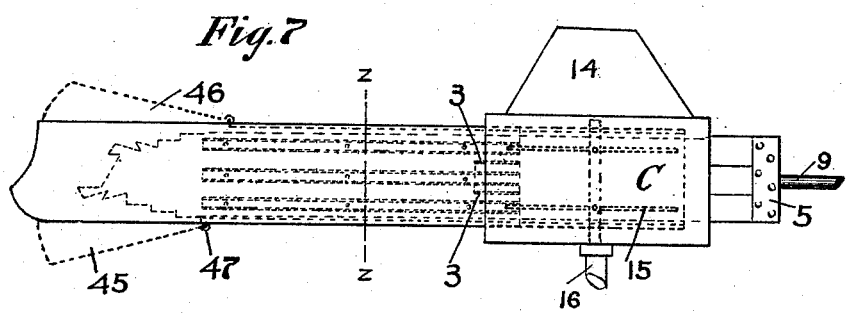
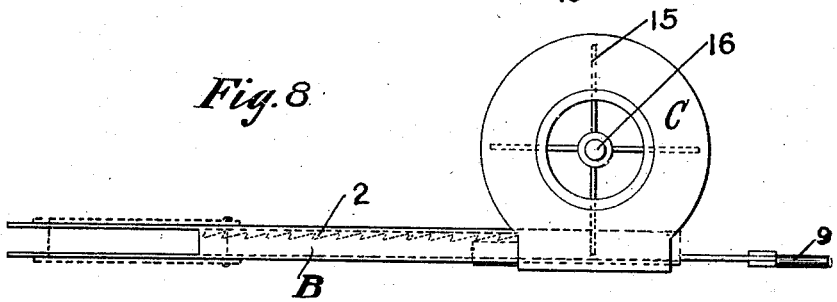
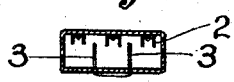
Witnesses,
George Voelker
Inventors,
Percy J. Brownson
Ralph Brownson
by Lothrop Johnson
their Attorneys.
THE NORRIS PETERS CO., WASHINGTON, D. C.

UNITED STATES PATENT OFFICE.

RALPH BROWNSON AND PERCY J. BROWNSON, OF ST. PAUL, MINNESOTA.

STUFFING-MACHINE.

976,982. Specification of Letters Patent. Patented Nov. 29, 1910.

Application filed May 14, 1906. Serial No. 316,691.

*To all whom it may concern:*

Be it known that we, RALPH BROWNSON and PERCY J. BROWNSON, citizens of the United States, residing at St. Paul, in the county of Ramsey and State of Minnesota, have invented certain new and useful Improvements in Stuffing-Machines, of which the following is a specification.

Our invention relates to improvements in stuffing machines designed especially for stuffing sweat pads for horses, and consists in the features of construction and combination hereinafter particularly described and claimed.

Figure 3:
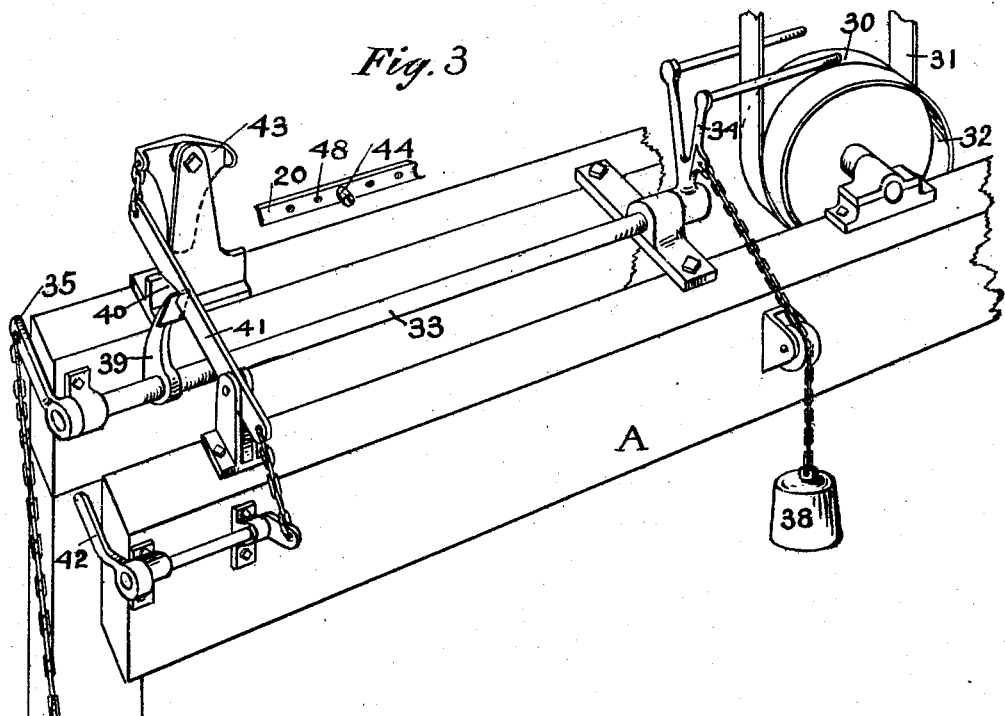
Figure 4:
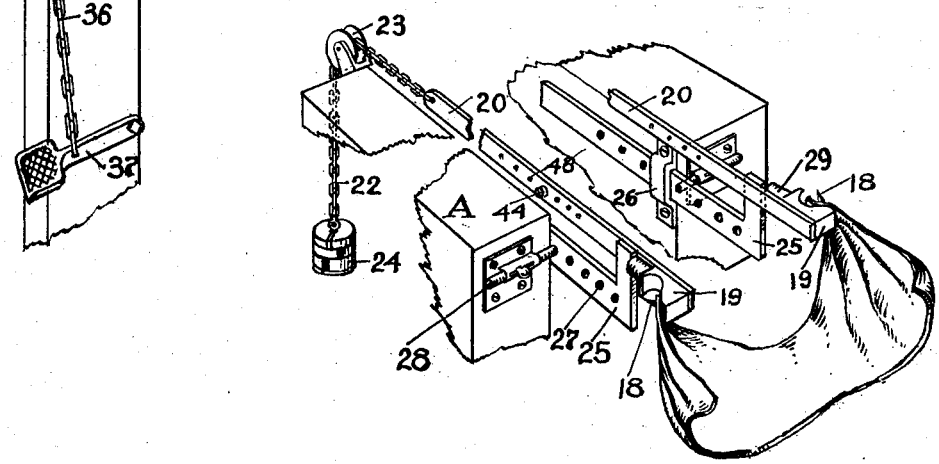

In the accompanying drawings forming part of this specification; Figure 1 is a side elevation of our improved apparatus; Fig. 2 is a plan view of the same; Fig. 3 is a perspective view of the belt shifting mechanism; Fig. 4 is a perspective view of the feeding mechanism; Fig. 5 is a perspective view of a plunger forming part of the invention; Fig. 6 is a section on line *y—y* of Fig. 5; Fig. 7 is a plan view of the feed tube; Fig. 8 is a side elevation of the same; Fig. 9 is a section on line *z—z* of Fig. 7, and Fig. 10 is a detail of an extension wing forming part of the invention.

In the drawings A represents the framework of the apparatus. Supported upon one end of the apparatus is a feed tube B and connected hopper C. The feed tube is rectangular in cross section as shown in Fig. 9, and carries upon the under side of its upper wall a series of downwardly and forwardly extending teeth 2. Short partitions 3 extend upwardly from the bottom wall of the tube between the teeth 2 at the inner end of the tube. Slidable within the tube is a plunger D, the plunger consisting of three sections 4 secured at their inner ends to the cross bars 5. Each of the sections 4 carry upwardly and forwardly extending teeth 6 which in use will stand between the rows of teeth 2. The forward end of the plunger is preferably irregular, as shown, to conform to the pad 7, and is provided with outwardly and forwardly extending teeth 8. When the plunger is in position in the tube the partitions 3 will extend upwardly between the sections of the plunger. The plunger carries an actuating rod 9 which is connected, as by means of a suitable cross-head 10 and connecting rod 11 with a crank 12 carried by the driving shaft 13. The hopper C is provided with a suitable inlet conduit 14 and contains a reel 15 mounted upon a central shaft 16, the shaft 16 having belt connection 17 with the driving shaft 13. The pad cover when inserted over the filling tube, as shown in dotted lines in Fig. 1, is hooked over rearwardly extending fingers 18 carried by heads 19 upon the forward ends of the slidable bars 20. The bars 20 slide on rolls 21 journaled in the frame A and have connected to their rear ends chains 22 running over sheaves 23 and carrying weights 24. The normal position of the bars 20 is regulated by the abutments 25 slidable in brackets 26 upon the frame-work, the abutments being formed with openings 27 into which is adapted to be fitted slidable latches 28 to hold said abutments in adjusted positions. Rubber blocks 29 preferably extend rearwardly from the head-pieces 19 to make contact with the ends of the abutments 25.

In Fig. 3 is illustrated the belt shifting mechanism, 30 representing the driving pulley connecting the shaft 13 by means of the belt 31 with a source of power not shown, and 32 representing a loose pulley. Journaled in the frame-work is a rod 33 carrying a belt shifter 34 at one end and having crank and chain connection 35 and 36 at its other with a foot treadle 37. The belt shifter is connected with a counterbalancing weight 38 as shown in Fig. 3, which tends to hold the belt upon the loose pulley. The rod 33 carries a dog 39 adapted to interlock with a notch 40 in the pivotally supported lever 41. The pivoted end of the lever is connected with a suitable actuating handle 42, and is connected at its other end with a pivoted trip 43. One of the slidable bars 20 lies alongside the trip 43 and is provided with an outwardly extending pin 44 adapted to engage with said trip as will be pointed out. When the dog 39 is interlocked with the lever 41, as shown in Fig. 3, it will be held by said lever from turning, holding the belt shifter in position to keep the belt 31 upon the main pulley 30. When the lever 41 is released from the dog 39, as by means of the trip being actuated by the pin 44 in the movement of the bar 20, the belt shifter will be actuated by its counterweight 38 to carry the belt to the loose pulley. When the belt is upon the loose pulley the parts may be turned into the position shown in Fig. 3 by depressing the treadle 37. Also when the parts are in the position shown in Fig. 3, the lever 41 and the dog 39 may be disconnected by manually operating the handle 42.

As illustrated in Figs. 7 and 8, we may, where desired, use extension wings 45 and 46, having hinge connection 47 with the ends of the outer side walls of the tube. The wings are preferably of the construction shown in Fig. 10, so as to overlap the top and bottom of the tube. The wing 45, as shown in Fig. 7, is hinged at a point forward of the wing 46, so that when the wings are out-turned, as shown in Fig. 7, they will conform to the irregular shape of the end of the sweat pad 7. They thus assist in the even filling of the pad.

In operation the pad cover to be filled will be placed over the end of the filling tube as shown in Fig. 1 and hooked over the fingers 18 of the slidable bars 20 as shown in Fig. 4. The apparatus then being set into operation will cause the filling material from the hopper to be forced forward through the tube by means of the coöperating teeth of the plunger and tube. Each forward movement of the plunger will cause its teeth to shove the material forward while the teeth carried by the tube will prevent the material being drawn back. As the material is forced into the pad cover the filled pad will be forced from the filling tube against the tension exerted upon the bars 20 by the weights 24. This tension will regulate the compactness with which the pad is filled with material, and will permit of uniform filling. To make the apparatus conform to different lengths of pad the normal position of the bars 20 may be adjusted, through the medium of the abutments 25, in the manner already described. The finger 44 may be so adjusted in the openings 48 of the bar 20 as to thrown the operating mechanism out of action at the desired point so that the apparatus may be automatically stopped when the pad is filled.

We claim:—

1. In an apparatus of the class described, a tube provided with forwardly extending interior teeth, and a plunger slidable within said tube and provided with upwardly and forwardly extending teeth coöperating with the interior teeth of said tube and provided at its forward end with laterally extending teeth for the purpose set forth.

2. In an apparatus of the class described, a rectangular tube provided with a plurality of rows of forwardly extending interior teeth for substantially the length of said tube, and a plunger rectangular in cross section slidable within said tube and provided with a plurality of rows of teeth extending forwardly between the rows of teeth carried by said tube.

3. In an apparatus of the class described, a tube, a toothed plunger slidable therein, pad supporting devices slidably supported alongside said tube, and means for applying tension to said supporting devices.

4. In an apparatus of the class described, a tube, a toothed plunger slidable therein, pad supporting bars slidable alongside said tube, means for exerting tension upon said bars, and means for adjusting the normal position of said bars.

5. In an apparatus of the class described, an interiorly toothed tube, a plunger slidable within said tube, pad supporting bars slidable alongside said tube, means for exerting tension upon said bars, abutments for said bars, and means for holding said abutments in adjusted positions.

6. In an apparatus of the class described, an interiorly toothed tube, a toothed plunger slidable therein, pad supporting bars slidable alongside said tube, counterweights for said bars, abutments for said bars, and means for holding said abutments in adjusted positions.

7. In an apparatus of the class described, an interiorly toothed tube, a toothed plunger slidable within the same, pad supporting bars arranged alongside said tube, means for exerting tension upon said bars, belt shifting mechanism, and means carried by said bars for actuating said belt shifting mechanism.

8. An apparatus of the class described, consisting of a tube having side wings hinged at one end and a contained plunger.

9. An apparatus of the class described, consisting of a tube having side extension wings hinged at one end, one of said wings being hinged at a point forward of the other wing and a contained plunger.

10. An apparatus of the class described, consisting of an interiorly toothed tube having side extension wings hinged at one end, one of said wings being hinged at a point forward of the other wing, partition walls in said tube, and a contained toothed plunger.

11. In an apparatus of the class described, an interiorly toothed tube, partition walls therein, and a sectional toothed plunger slidable within said tube, with its sections standing intermediate of said partition walls and the side walls of said tube.

In testimony whereof we affix our signatures in presence of two witnesses.

RALPH BROWNSON.
PERCY J. BROWNSON.

Witnesses:
H. S. JOHNSON,
A. D. MADDEN.